United States Patent [19]

Holmes

[11] Patent Number: 4,862,837

[45] Date of Patent: Sep. 5, 1989

[54] FUEL INJECTION OF COAL SLURRY USING VORTEX NOZZLES AND VALVES

[75] Inventor: Allen B. Holmes, Rockville, Md.

[73] Assignee: Defense Research Technologies, Inc., Rockville, Md.

[21] Appl. No.: 184,582

[22] Filed: Apr. 21, 1988

[51] Int. Cl.$^4$ .............................................. F02D 19/04
[52] U.S. Cl. ...................................... 123/23; 239/406; 239/414
[58] Field of Search ................... 123/23; 239/405, 406, 239/413, 414, 464, 470, 474

[56] References Cited

U.S. PATENT DOCUMENTS

| | | | |
|---|---|---|---|
| 2,890,836 | 6/1959 | Gusmer et al. | 239/414 X |
| 2,999,647 | 9/1961 | Sosnick | 239/414 X |
| 3,979,069 | 9/1976 | Garofalo | 239/405 X |
| 4,070,997 | 1/1978 | Steiger | 123/23 |
| 4,736,712 | 4/1988 | Savkar et al. | 123/23 |
| 4,782,794 | 11/1988 | Hsu et al. | 123/23 |

FOREIGN PATENT DOCUMENTS

| | | | |
|---|---|---|---|
| 123722 | 7/1931 | Austria | 123/23 |
| 692470 | 6/1953 | United Kingdom | 239/414 |

OTHER PUBLICATIONS

Krieger et al., *Journal of Applied Physics*, vol. 23, No. 1, pp. 147–149, Jan. 1952.
Krieger et al., *Journal of Applied Physics*, vol 24. No. 2, pp. 134–136, Feb. 1953.
Krieger et al., *Journal of Applied Physics*, vol. 25, No. 1, pp. 72–75, Jan. 1954.
Som et al., *Chem Eng. & Processes*, vol. 20, No. 4, pp. 191–200, Jul.–Aug. 1984.
*Engineering*, pp. 21–23, Jan. 12, 1945.
Som et al., *IE (I) Journal-ME*, vol. 60, pp. 125–129, Mar. 1980.
DeCorso, *Transactions of the ASME, Journal of Engineering for Power*, pp. 19–18, Jan. 1960.
Som et al., "Theoretical and Experimental Investigations on the Formation of Air Core in a Swirl Spray Atomizing Nozzle", *Acta Mech.*, vol. 36, p. 79, 6/1980.

*Primary Examiner*—Noah P. Kamen
*Attorney, Agent, or Firm*—Epstein & Edell

[57] ABSTRACT

Injection of atomized coal slurry fuel into an engine combustion chamber is achieved at relatively low pressures by means of a vortex swirl nozzle. The outlet opening of the vortex nozzle is considerably larger than conventional nozzle outlets, thereby eliminating major sources of failure due to clogging by contaminants in the fuel. Control fluid, such as air, may be used to impart vorticity to the slurry and/or purge the nozzle of contaminants during the times between measured slurry charges. The measured slurry charges may be produced by a diaphragm pump or by vortex valves controlled by a separate control fluid. Fluidic circuitry, employing vortex valves to alternatively block and pass cool slurry fuel flow, is disclosed.

28 Claims, 4 Drawing Sheets

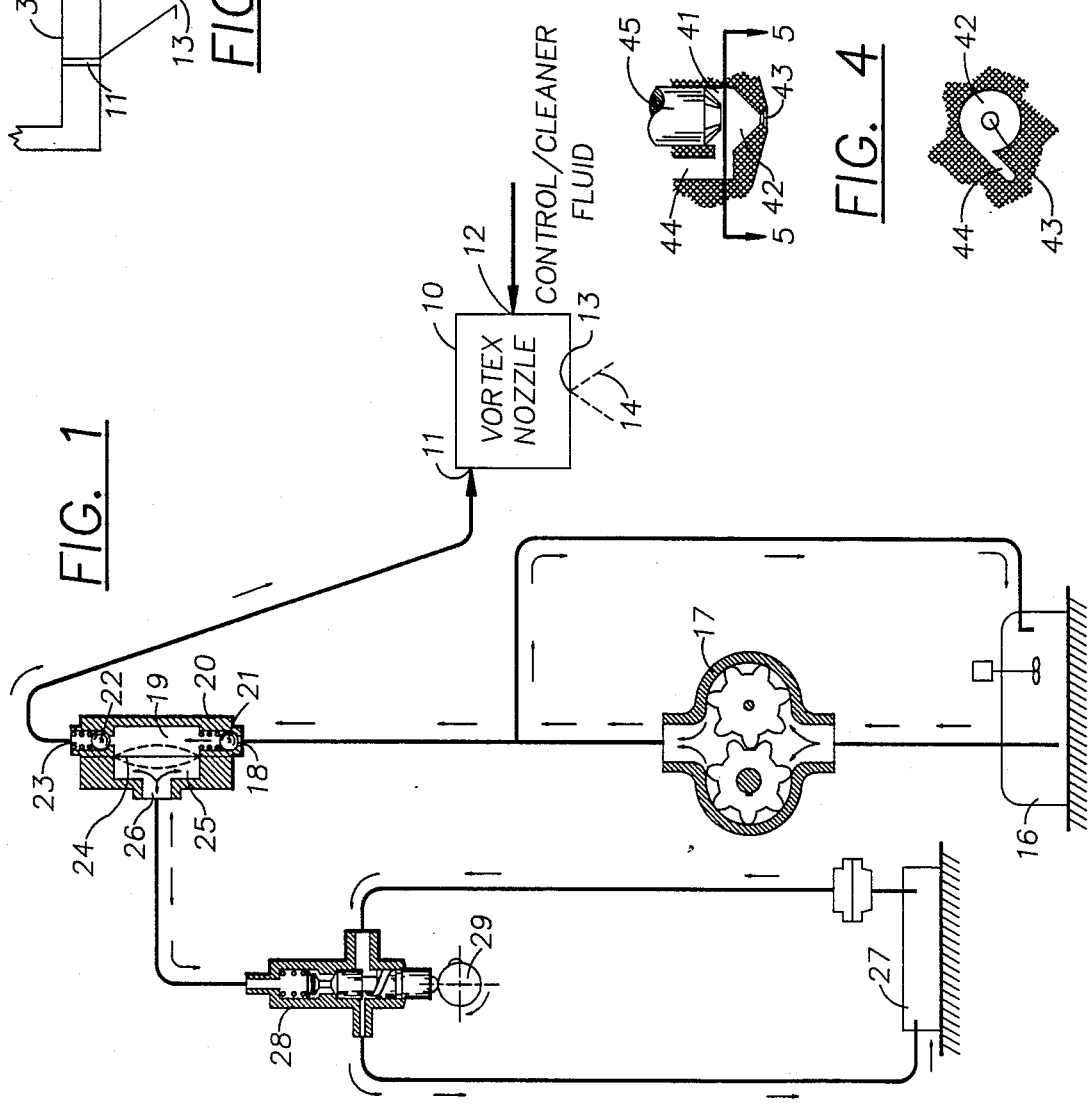

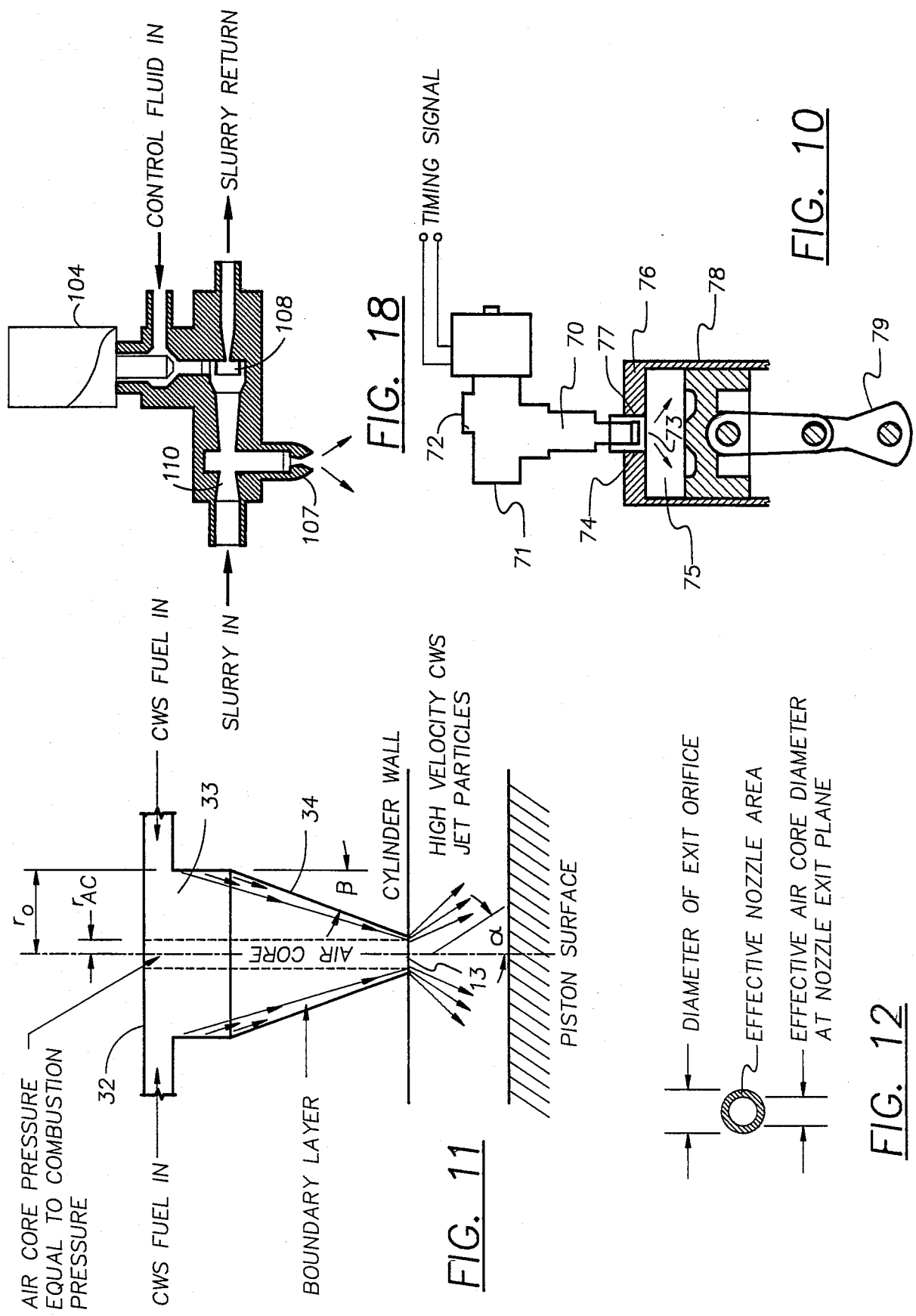

FUEL INJECTION OF COAL SLURRY USING VORTEX NOZZLES AND VALVES

BACKGROUND OF THE INVENTION

1. Technical Field

The present invention relates to the use of vortex valves and nozzles in coal slurry fuel handling, control and injection to improve the useful life of control hardware and to permit atomization of the coal slurry fuel at lower pressures than have been heretofore possible. The invention has particular utility in internal combustion fuel injection systems to control the injection of diesel oil and coal slurry type fuel into an engine cylinder during the combustion process.

2. Discussion of the Prior Art

Internal combustion engines exhibit poor efficiency when fuel is not atomized properly by the injector nozzles, especially when certain types of fuel, such as coal/water, coal/diesel fuel, and low grade diesel fuels, are employed. The problems associated with atomization are compounded in slurries which are highly viscous, non-Newtonian fluids in which viscosity varies with shear rate, temperature and, in many cases, the past history of the fuel storage and delivery systems. To overcome this problem the trend has been toward higher injection pressures. High injection pressures (i.e., above 6,000 psi) require proportionately smaller injector nozzle port areas to pass an equivalent amount of fuel into the engine. Typical fuel injector systems used in diesel engines with diesel fuel require one or more very small injection ports (e.g., 0.25 to 0.50 mm) and injection pressures on the order of 5,000 to 10,000 psi to atomize and disburse the fuel in the engine combustion chamber. When coal slurry fuels are employed, the pressures required for optimum atomization are generally much higher (i.e., 15,000 to 30,000 psi), which means that the injection ports must be proportionately much smaller. The smaller nozzles tend to become clogged with solid coal particles and ash content in coal slurry fuels. This, plus the tendency of such fuels to shear thin and then re-thicken at increasing shear rates, combined with the high injection pressures and the correspondingly higher flow velocities through small nozzles, tends to clog the nozzles and produce increased wear due to erosion. In addition, the char particles that are produced during combustion tend to create deposits which clog the small injection nozzles. Further, the principal limiting factor in the use of high injection pressures is the relatively high cost and high reliability requirements placed upon the precision components that must supply fuel at pressures in the 6,000 to 20,000 psi range. These combined problems place a practical limit on the maximum pressures which can be pumped reliably, resulting in achieving less than optimum atomization in present coal slurry engines.

OBJECTS AND SUMMARY OF THE INVENTION

The primary object of the present invention is to control the injection of coal slurry fuels, and the like, into an internal combustion engine in a manner which substantially eliminates the aforementioned problems.

Another object of the present invention is to provide a fuel injector nozzle capable of atomizing coal slurry diesel fuels at pressures that are significantly lower than those normally associated with conventional single and multi-port injector nozzle atomizers.

It is another object of the present invention to provide a coal slurry fuel injector nozzle having a port area that is much larger than is possible in prior art injector nozzles and which, therefore, is less susceptible to clogging.

A further object of the present invention is to provide a coal slurry fuel injection nozzle capable of self-cleaning action.

Still another object of the present invention is to provide a fluidic control circuit capable of delivering coal slurry fuel to an internal combustion engine without clogging or causing premature erosion and wear.

It is yet another object of the present invention to provide a control valve having its own self cleaning action.

In accordance with the present invention a vortex swirl nozzle issues coal slurry into an engine combustion chamber in a conical sheet pattern that atomizes a short distance downstream of the nozzle. Atomization of the viscous, non-Newtonian fluid can be achieved at fluid pressures below 1,000 psi for some applications and, for most typical diesel engines, at fluid pressures between 2,000 and 4,000 psi. Control fluid, such as air, water, or diesel fuel, may also be delivered tangentially into the vortex nozzle to produce a vertical swirl in coal slurry and/or to purge the vortex chamber of fuel contaminants at times between metered charges of the slurry. The vortex swirl injector nozzle may be used either in series with a fluid actuated vortex valve or in conjunction with a mechanically actuated pintle valve that seats in the immediate area of the nozzle outlet. In either case, when pressurized the slurry is discharged through the swirl nozzle outlet in the form cf a conical sheet-type spray. Because an air core is formed in the central portion of the swirl nozzle outlet, the effective area of the opening is considerably smaller than the real area and therefore is much less susceptible to clogging than a conventional injector nozzle with an equivalent nozzle outlet area.

In a preferred embodiment the metered slurry charges are delivered to the vortex swirl nozzle by a diaphragm pump which, in turn, is driven by a standard type positive displacement diesel fuel injector pump. A fixed volume of slurry is isolated from pulsedly pressurized hydraulic fluid that expands the diaphragm to pressurize the slurry and cause it to flow to the nozzle. Control of coal slurry flow to a fluid injection nozzle may also be achieved by vortex valves that are selectively pressurized by control fluid to prevent slurry flow through the valve. Valve actuation is synchronized with engine timing to assure proper delivery times of the measured slurry charges.

BRIEF DESCRIPTION OF THE DRAWINGS

The above and still further objects, features and advantages of the present invention will become apparent upon consideration of the following detailed description of specific embodiments thereof, especially when taken in conjunction with the accompanying drawings wherein like reference numerals in the various figures are utilized to designate like components, and wherein:

FIG. 1 is a schematic diagram of a system for delivering metered charges of coal slurry to a vortex nozzle in accordance with the present invention;

FIG. 2 is a schematic illustration of a vortex swirl nozzle utilized in the present invention, the nozzle being illustrated in elevation;

FIG. 3 is a schematic top view in plan of the nozzle of FIG. 2;

FIG. 4 is a view in elevation of another nozzle arrangement in accordance with the present invention;

FIG. 5 is a top view in plan of the nozzle of FIG. 4;

FIG. 6 is a view in elevation of a further nozzle arrangement in accordance with the present invention;

FIG. 7 is a top view in plan of the nozzle illustrated in FIG. 6;

FIG. 8 is a view in plan of a still further nozzle arrangement in accordance with the present invention;

FIG. 9 is a top view in plan of the nozzle illustrated in FIG. 8;

FIG. 10 is a diagrammatic illustration in partial section showing how the nozzles of the present invention may be mounted in relation to an engine combustion chamber;

FIG. 11 is a schematic illustration of a vortex swirl nozzle utilized in accordance with the present invention showing flow patterns and dimensional relationships;

FIG. 12 is a diagrammatic illustration in plan of the effective outlet area of the nozzle of FIG. 11, compared to the real area;

FIG. 18 is a view in section, partially schematic, of venturi control arrangement for delivering metered charges of coal slurry fuel to a vortex swirl nozzle in accordance with the present invention;

DESCRIPTION OF THE PREFERRED EMBODIMENTS

Figure 13:
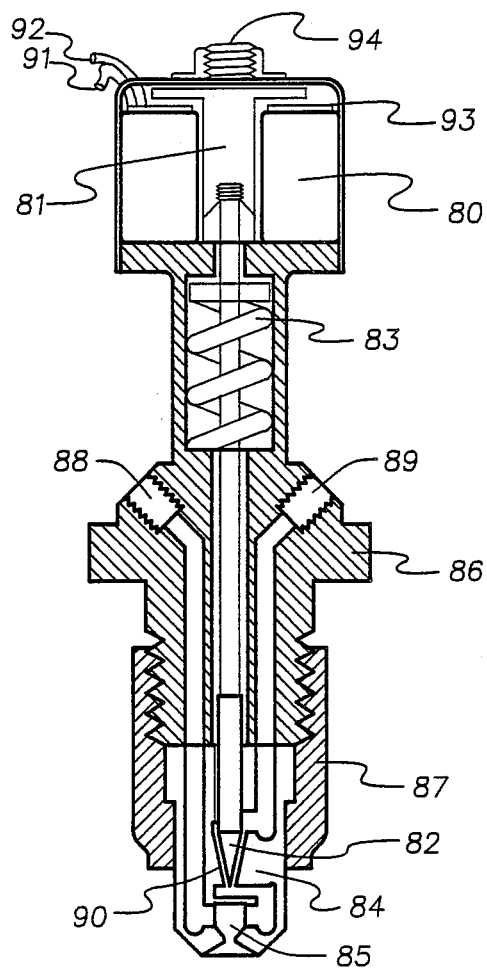
FIG. 13 is a sectional view in elevation of a vortex swirl nozzle combined in a housing with a cam-actuated pintle valve structure in accordance with the present invention.

Referring specifically to FIG. 1 of the accompanying drawings, a fluidic fuel injection system according to the present invention includes a vortex nozzle 10 (shown schematically in FIG. 1) having a fuel inlet port 11, a control fluid inlet port 12 and the outlet port 13. Various embodiments of vortex nozzles are described below; for purposes of the present description it need only be understood that the nozzle has an annular chamber in which the fuel is caused to spin in a vortical pattern so as to issue from outlet port 13 located centrally of the chamber. The fuel employed in the system is coal slurry and is supplied from a fuel tank or reservoir 16 from which it is pumped by a conventional gear pump 17, or the like, to inflow port 18 of an output chamber 19 in a conventional diaphragm pump 20. A check valve 21 is disposed at inflow port 18 and permits only inflow; into chamber 19 via that port. An output check valve 22 is disposed at an outflow port 22 of chamber 19 and permits only outflow of fuel from the chamber via port 23.

Output chamber 19 is separated from an input chamber 25 by means of a deflectable diaphragm 24 stretched across the hollow interior region in pump 20. A port 26 permits ingress and egress of hydraulic fluid into the pump input chamber 25. Hydraulic fluid is stored in a reservoir or tank 27 and delivered to a conventional diesel-type jerk pump 28 that pulsedly drives the hydraulic fluid into the diaphragm pump input chamber 25. Jerk pump 28 is controlled by an engine timing cam 29 to deliver pulses of hydraulic fluid to the diaphragm pump at a repetition rate determined by engine demand for fuel in a conventional manner known by those familiar with conventional diesel engine operation.

In operation, each pulse of hydraulic fluid entering the input chamber 25 of diaphragm pump 20 pulsedly expands diaphragm 24 into output chamber 19 and thereby forces a fixed volume or charge of fuel through outlet 23 to the inlet port of vortex nozzle 10. Since the repetition rate of the pulsed hydraulic actuator fluid is dependent on engine fuel demand, the repetition rate of the fuel charges, which is the same as the hydraulic fluid pulse rate, is similarly dependent upon engine fuel demand. The fuel charge enters the vortex chamber in nozzle 10 wherein a tangential flow component is imparted to the fuel, causing the fuel to issue from the outlet port 13 in the form of a spinning conical sheet 14. Nozzle operation is described in greater detail below.

The fuel employed in the system described above is typically a coal slurry having approximately equal parts, by weight, of water and coal particles, although the coal composition may vary from thirty to seventy percent by weight. In addition, diesel fuel may be utilized as the carrier fluid in place of water. The carrier fluid may also be air which carries coal particles in coal dust form. The resulting non-Newtonian fluid, having a viscosity that is a function of shear rate, is typically atomized by the vortex nozzle utilizing fuel pressures (e.g., pressures produced in the fuel at diaphragm pump 20) that are typically on the order of 4,000 to 5,000 psi, although sufficient atomization has been achieved for some applications at pressures as low as approximately 1,000 psi. In addition, there are some applications that may require fuel pressures somewhat higher, for example 8,000 psi. These fuel pressures are to be compared with the ranges of pressure from 15,000 to 30,000 psi required to efficiently atomize the same and similar fluids with conventional, non-vortex spray nozzles. It is to be noted that misting, and not merely spraying, is the desired result for fuel injection applications, and misting and spray pattern atomization of coal slurry has not been attained at these relatively low pressures prior to the present invention.

One embodiment of a vortex nozzle 10 of the type employed in the fuel injection system of the present invention is illustrated in FIGS. 2 and 3 to which specific reference is now made. An annular vortex chamber 33 has a generally circular peripheral or outer wall through which fuel inlet port 11 and control fluid inlet port 12 are defined at angularly-spaced locations. The top of the vortex chamber is closed by a wall 33, it being understood that relative orientation adjectives such as "top", "bottom", etc., are utilized herein to simplify the present description and are not intended to limit the orientation of the nozzle when mounted for use. The bottom of the vortex chamber is completely open and joins a frusto-conical spin chamber 34 at the open, larger-diameter end of that chamber. The open smaller-diameter end of spin chamber 34 defines the nozzle outlet port 13.

In the embodiment illustrated in FIGS. 2 and 3, both the fuel inlet port 11 and the control fluid inlet port 12 are oriented to issue flow having a tangential component into vortex chamber 33. The tangential flow components are both in the same direction which, as viewed in the perspective of FIG. 3, is counterclockwise. The tangential entry of the fuel results in flow of the slurry around the circumference of the chamber. When the entry velocity is high enough, the tangential velocity of the fuel increases as the distance of the particular fuel component decreases from the center of the chamber. The increasing velocity produces a corresponding pressure gradient between the slower moving (higher pressure) fluid particles at the outer radius of the chamber and the higher velocity (lower pressure) particles approaching the center of the chamber. As the tangential velocity increases, hydrodynamic principals dictate that a cavitation bubble, or "air vortex", forms in the vortex chamber and at the upper end of the spin chamber 34, ultimately moving along the central axis of the spin chamber to the outlet nozzle 13. The resulting "air vortex", bounded between the central core and the peripheral wall of swirl chamber 34, produces a high velocity annular jet issuing from outlet port 13. The annular jet has an axial velocity component determined by the effective annular area, the flow rate, and the tangential velocity component. The tangential velocity component is, in turn, dependent upon the entrance velocity and geometry (inner and outer radii of the vortex chamber 33 at any given axial point along the length of spin chamber 34). The annular jet leaving outlet port 13 expands in the form of a hollow conical sheet of finely dispersed (i.e., atomized) fluid particles. The particle size (i.e., the mean diameter), the spray angle, and the discharge coefficient are dependent upon the geometry of outlet port 13, the fluid properties, and flow conditions for the slurry entering and leaving the nozzle.

In general, the control fluid entering control fluid inlet port 12 may be issued into the vortex chamber 33 according to any of four different operating modes. In one mode, the control fluid is issued continuously into the chamber. In this mode, when a charge of coal slurry enters the chamber, the tangential flow velocity of the coal slurry is augmented by the tangential flow of the control fluid. In the time intervals between fuel charges entering the vortex chamber, the control flow is delivered continuously at a pressure no greater than the maximum pressure caused by compression in the combustion chamber of the engine. The compressed air or other control fluid is utilized to scavenge the vortex and spin chambers to prevent residual contamination and char from forming on the walls or edges of the nozzle structure and to prevent burn-back inside the vortex chamber. The control fluid flow is also utilized to block entry into the vortex chamber of an fuel which might otherwise leak through the supply line and drip through the nozzle into the combustion chamber of the engine.

In a second operating mode the control fluid and the fuel are delivered to the nozzle at different times in each cycle. In this mode the control fluid cleans the nozzle between each delivered fuel charge and blocks entry of any fuel that might otherwise leak through the supply line. However, the control fluid does not mix with the fuel in this mode.

In a third operating mode the control fluid is supplied continuously but the fluid pressure is much lower during delivery of fuel charges to the nozzle. The control fluid thus mixes with the fuel charges and aids the tangential flow component of the fuel. During the times between fuel charges, the higher control fluid pressure cleans the nozzle and prevents fuel leakage into the nozzle.

In a fourth operating mode, no control fluid is used and the fuel enters the nozzle through one or more tangential inlets. In this arrangement a physical blockage such as a valve pintle or needle is used to close the outlet in the vortex nozzle.

Considering the fuel delivery portion of the cycle once again, the fuel is delivered to fuel inlet port 11 at high pressure due to the action of the jerk pump 28 operating in conjunction with diaphragm pump 20 in the manner described above. As the fuel enters the vortex chamber 33 it impinges on the air flow (in the first operating mode) which augments the tangential flow component in the fuel. The fuel air mixture then forms a free vortex in the chamber. In the manner described above, the vortex produces vaporization of the liquid fuel in the central portion of the chamber, resulting in an air core extending from the vortex chamber through the spin chamber and outlet port 13. Under these circumstances the fuel-air mixture emerges from the outlet port 13 as a spinning conical sheet of atomized particles. The conical angle is a function of the relative magnitudes of the tangential and radial velocity components of the fluids delivered to the vortex chamber. Because fuel only discharges through the annular flow formed between the air core and the outlet port, the vortex nozzle exhibits the pressure-flow characteristics of a conventional nozzle that is physically much smaller in diameter, and the atomization characteristics of a very narrow-width slot. The narrow gap formed by the annulus in the conical spray pattern causes the fuel to exit in the form of a very thin sheet which breaks up into atomized fuel particles when the divergence of the streamlines overcomes the surface tension of the fuel.

In addition to the coal-water composition ranges described above, the coal slurry fuel typically has a density on the order of 9.1 pounds per gallon and a viscosity on the order of 200 cp. Typical fuel charge volumes provided by the diaphragm pump 20 are on the order of 225 cubic millimeters, or less and have time durations typically within the range of two to five milliseconds.

Typical dimensions for the vortex nozzle include a diameter of outlet port 13 in the range of 0.5 to 2.0 millimeters. A typical ratio between the actual area of outlet port 13 to the effective area of the outlet port due to vorticity ranges between 5:1 and 10:1. A typical conical angle for the spin chamber 34 is 90°. Under such circumstances the discharge coefficient for the nozzle is in the range of 0.1 to 0.5, and the spray cone angle is in the range of 45° to 100°. Droplet sizes on the order of 5 microns have been calculated and observed visually achieved with the aforementioned dimensions and parameters.

For a greater understanding of the operation of the vortex nozzle, reference is made to FIG. 11 wherein the vortex nozzle is shown schematically, and to FIG. 12 wherein the effective diameter and actual diameter of the nozzle are illustrated. For purposes of this description a coal-water slurry fuel is shown being issued into the vortex chamber 33 from two tangentially-oriented inlets. The tangential entry results in flow of the fuel around the circumference of the vortex chamber 33 and spin chamber 34. For purposes of this discussion, it is assumed that the entrance velocity of the slurry is high enough so that the flow is essentially frictionless. It will be understood that in actual cases, flow through a vortex swirl nozzle passes primarily through the boundary layer.

For frictionless conditions, the angular momentum of the fluid is conserved so that the tangential velocity of a fluid particle increases as the radius of the convergent spin chamber decreases. The increasing velocity produces a corresponding reduction in static pressure as the fluid converges toward the central axis of the spin chamber. The air core vortex or cylindrical cavitation region is formed inside and along the central longitudinal axis of the spin chamber. The air core, which is free of liquid particles, begins to form at the top wall 32 of the vortex chamber and ultimately extends through the outlet port 13. Since the air core extends through the outlet port of the spin chamber 34, the static pressure and temperature of the air inside the air core is equal to the ambient pressure and temperature outside the vortex chamber which, in the case of a diesel engine, is equal to the pressure and temperature of the gases in the engine cylinder.

The liquid fuel emerges through the outlet port of the spin chamber in the form of a spinning annular jet that diverges to form a hollow conical sheet of finely dispersed fluid particles. The axial velocity component at the exit plane of the outlet port 13 is equal to the volumetric flow rate multiplied by the effective area of the annular jet. In view of the fact that the path of the liquid inside the vortex chamber is helical and forms an air vortex, a cylindrical cavitation region, free of liquid particles, is formed.

Based on the radius of the air core, the discharge coefficient, or effective area of the outlet port of the vortex nozzle, is simply determined by the ratio of the air core area to the exit area of the outlet port of the nozzle. The discharge coefficient decreases with an increase in outlet port Reynolds number. The rate of decrease of discharge coefficient is greatest for lower Reynolds number (at or below $10^4$) and relatively independent of Reynolds number in the range near and above $10^5$. The discharge coefficient has been shown to be quite low, typically ranging from 0.5 to 0.05. The actual value of the discharge coefficient for a given vortex swirl nozzle application depends principally upon the geometric properties of the fluid and the input flow conditions. For a coal fuel slurry, a low discharge coefficient is considered to be advantageous because the diameter of the outlet port employed in a vortex swirl nozzle is considerably larger than for a single or multiport injector nozzle sized to inject the same amount of fuel at a given pressure. Larger nozzle sizes decrease susceptibility to clogging.

The spray cone angle or divergent angle $\alpha$ may be determined by the following equation:

$$\tan(\alpha/2) = v_t/v_a,$$

wherein $v_t$ is the average tangential velocity at the plane of the outlet port 13, $v_a$ is the axial velocity at the plane of the outlet port, and $\alpha$ is the divergence angle. The spray angle tends to increase as a function of: (1) increased ratio of the outlet port 13 orifice diameter to the vortex chamber 33 diameter; (2) increases in spin chamber angle $\beta$; and (3) decreases in swirl chamber aspect ratio. Spray cone angles $\alpha$ up to one hundred degrees are typically achieved.

Physical vortex nozzle designs, also suitable for use with the fuel injection system of the present invention, are illustrated in FIGS. 4 and 9. Referring now to the simplest arrangement of FIGS. 4 and 5, vortex chamber 41 has a single fuel inlet 44 arranged to issue the fuel charges tangentially into the chamber. Flow from vortex chamber 41 is issued into the frustoconical spin chamber 42 and issues from outlet port 43 in the manner described above. In this embodiment there is no control fluid. A pintle valve 45 is selectively actuated in a conventional manner to block the inlet 44 and prevent leakage of fuel into the vortex chamber during non-charge time intervals.

Another vortex nozzle embodiment is illustrated in FIGS. 6 and 7. In this embodiment: charges of the slurry fuel enter the vortex chamber 51 from a tangentially-oriented fuel inlet 54 and are directed through spin chamber 52 and out through outlet port 53 in the manner described above. A pintle valve 55 selectively blocks inlet 54 between the times of fuel charges. In addition, a control fluid inlet 56 directs air, water or other control fluid tangentially into the chamber either continuously or at times between fuel charges. The control fluid prevents fuel from leaking through fuel inlet 54 into the vortex nozzle chamber 52 and through the engine cylinder via outlet 53. In addition, the control fluid scours both the vortex and spin chambers in the manner described above. If the control fluid is present simultaneously with the fuel charges in the vortex and spin chambers, it imparts additional& tangential velocity to the fuel-control fluid mixture.

A still further vortex nozzle embodiment for use in conjunction with the fuel injection system of the present invention is illustrated in FIGS. 8 and 9. The vortex nozzle includes a vortex chamber 61 feeding a swirl chamber 62 having a outlet port 63. Charges of fuel are directed radially into the vortex chamber 61 via fuel inlet port 64. Control fluid is issued into the vortex chamber 61 via control port 69. It is the control port 69 that is oriented to issue fluid into the vortex chamber with a tangential flow component that causes the radially-directed fuel to flow tangentially.

Control of the control fluid is effected by a vortex valve having a vortex chamber 67, a control fluid inlet 66, a spin chamber 68 and a spin chamber outlet 70 that feeds the control fluid inlet port 69 for &:he vortex valve. A pintle valve 65 movable axially in the control valve (in the same manner that pintle valves 45 and 55 move axially in the vortex valves of FIGS. 4 and 5) controls the pressure at which the control fluid is delivered through the valve to inlet port 69 of the vortex nozzle.

Pintle valve stem 65 does not provide a close fit seal in the vortex and spin chambers of the vortex valve because a small leakage rate is desirable. Accordingly, control fluid is supplied through the valve to the control fluid inlet port 69 of the vortex nozzle at all times, but the pressure of that fluid varies with the position of the valve. When the pressure of the control fluid is high (i.e., the pintle valve is wide open), the pressure developed in the vortex chamber 61 of the vortex nozzle is sufficiently high to prevent entry of radially-directed fuel into the vortex chamber. Partial closure of the pintle valve 65 reduces the pressure of the control fluid significantly but not enough to prevent the control fluid from imparting tangential flow to the radially-directed fuel in vortex chamber 61. The valve stem 65, therefore, controls the cycling of control fluid into the nozzle vortex chamber 61 and is synchronized with the delivery of fuel charges via fuel inlet port 64. Typically, control fluid is at high pressure (i.e., pintle valve open) for approximately ninety percent of the injection cycle, during which time the control fluid completely shuts off fuel inflow into the nozzle while cleansing the nozzle of contaminants and char. For air as a control fluid, during the high pressure portion of the cycle the pressure of the control fluid is approximately one and a half to two times the pressure of the delivered coal slurry. When pintle valve 65 is in its partially closed position, the air pressure reduces significantly but remains sufficient to impart the required tangential velocity component to the fuel flow in vortex chamber 61. The pintle valve 65 may be operated mechanically in synchronization with engine timing, or it may be moved axial by the air pressure itself in which case the pressure of the air is synchronized to the engine timing. Lower air pressure permits the pintle valve to be moved, by an appropriate bias force, towards its closed position. Increased air pressure drives the pintle valve stem 65 in opposition to the bias force and thereby open the vortex valve wider.

Referring now to FIG. 10 of the accompanying drawings, a typical mounting arrangement for a vortex nozzle in a fuel injection system of the present invention is illustrated in partially schematic detail. An injector housing 70 includes a fuel inlet port 71, a control fluid inlet port 72 and an outlet port 73. The injector housing 35 is mounted at an end of a piston housing 76 such that the vortex nozzle 74 projects into a housing opening 77. This opening is positioned to face a piston 78 in chamber 75 wherein the piston reciprocates under control of the engine crank shaft 79 to cyclically compress an air change in the visual manner. Outlet port 73 is oriented to issue the spinning conical sheet of atomized coal slurry fuel from chamber 75 in the manner described above. A timing signal is applied to the injector from the engine timing control system to effect timed application of the fuel and coal control fluids in accordance with engine fuel demand in the manner described above.

FIG. 13 is a cross-sectional view of a vortex nozzle unit that is controlled by a solenoid-actuated needle valve as part of a fuel injection system of the present invention. The assembly includes a solenoid coil 80, iron core piece 81, needle 82, return spring 83 and vortex nozzle tip assembly 84. The tip assembly 84 contains a vortex nozzle 85 similar to that described in relation to FIGS. 8 and 9. The tip assembly 84 is secured to actuator housing 86 by retainer 87. Two inlet connections 88 and 89 are provided in actuator housing 86 for control air and fuel, respectively. Screw 94 is used to adjust the gap between coil 80 and core 81, which in turn, adjusts the distance (i.e., port area) between needle 82 and valve seat 90.

The vortex nozzle unit shown in FIG. 13 is mounted on the end of the piston housing in a manner similar to that illustrated in FIG. 10. Two electrical leads 91 and 92 provide the means for providing current to coil 80.

In operation, compressed air is supplied to inlet 89 and fuel is supplied to inlet 88. With the solenoid de-energized, return spring 83 holds core 81 against adjusting screw 94 which, in turn, raises the needle to thereby open the valve. With the valve open compressed air applies a maximum pressure signal to the tangential control inlet 69 shown in FIG. 9. The control signal produces a strong air vortex in the vortex nozzle. The throttling action of the compressed air vortex shuts off the fuel supply and purges the nozzle chamber. Energizing the solenoid establishes a magnetic field which acts on core 81, driving it towards the seat 93. This partially closes the needle valve, thereby restricting the air flow which reduces the vortex throttling action of the air flow and allows a fuel charge to swirl through the vortex nozzle into the engine cylinder. Timing signals for actuating the solenoid are derived from the engine timing cam in the usual manner.

Figure 14:
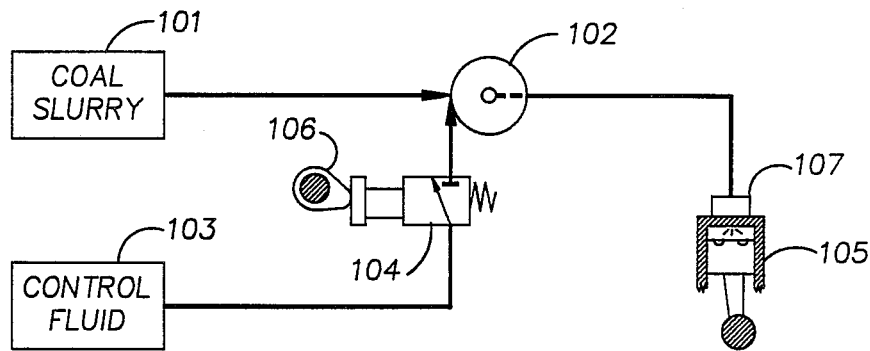
FIG. 14 is a schematic diagram of a fluidic coal slurry fuel injection circuit constructed in accordance with the present invention.

In addition to the use of a vortex nozzle to atomize coal slurry type fuels in a fuel injection system, the present invention also includes the utilization of vortex valves to permit selective control of the coal slurry fuel to the nozzle. In a vortex slurry fuel injector valve, the basic idea is to control the on-off time of the slurry with a clean fluid, such as water, diesel oil or compressed air. Typically, the control fluid is the same control fluid utilized in connection with the vortex nozzle. In the valve, the clean fluid is controlled by standard timing means (i.e., by passing it through a cam actuated valve that is in turn controlled by the engine timing cam). The slurry is turned on and off by the throttling action produced in the vortex valve. FIG. 14 is an illustration of a fluidic coal slurry fuel injection circuit employing only a vortex valve. Coal slurry from a supply 101 is delivered under constant pressure to a radial inlet port of a vortex valve 102. Control fluid is delivered under constant pressure from a control fluid supply 103 to a tangential control inlet port of vortex valve 102. When the valve is open, the tangential control flow enters the chamber and produces centrifugal pressure forces that shut off the slurry fuel and prevent the fuel from being delivered via vortex nozzle 107 to an engine cylinder during the exhaust and compression portions of the diesel cycle.

If compressed air is utilized as the control fluid to maintain the vortex, it is exhausted into the combustion chamber during the exhaust and compression portions of the cycle. If a fluid such as water or diesel oil is utilized to produce the vortex in valve 102, the fluid is bleed off and returned to a sump. When the control fluid is shut off, the slurry fuel is injected into the engine combustion chamber. Other slurry handling and control circuit implementations are described below in references to FIGS. 15, 16 and 17.

Figure 19:
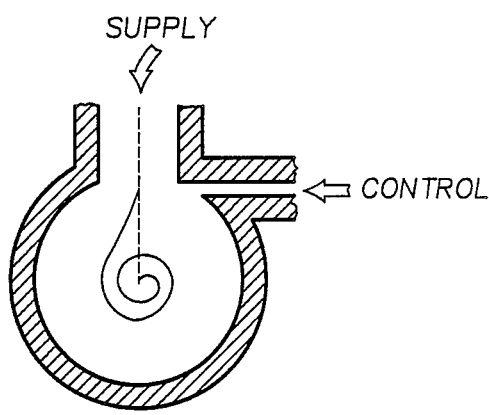
FIG. 19 is a schematic view in plan of a vortex valve employed in the fuel injection system of the present invention; and, FIG. 20 is a schematic view in section of the valve of FIG. 19.
Figure 20:
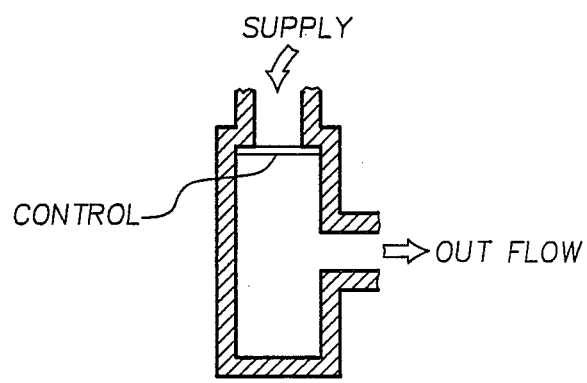

Operation of vortex valve 102 may be better appreciated with reference to FIGS. 19 and 20 of the accompanying drawings. The valve is a no-moving parts device that alternatively permits and blocks slurry flow to the engine. The main slurry fluid flow enters radially through a supply inlet port along a path aimed directly toward the center of the vortex chamber. Control flow enters the chamber along a path directed tangentially to the circumference of the chamber wall. When flow is established in a vortex valve, the flow rate is determined by the supply pressure, the exhaust pressure, the area of the out flow opening, and the strength of the vortex produced in the chamber. When the control flow is zero, no vortex is produced; under such circumstances the supply flow is at its maximum value through the valve. When the supply port is larger than the outlet port, the pressure throughout the vortex chamber is essentially constant, and the fuel flow rate is determined solely by the supply pressure, outlet pressure, and the outlet port area. When the control pressure is raised to a level greater than the supply pressure, a control flow is established and a vortex is produced.

Typical parameters associated with a vortex valve employed in a fuel injection system of the present invention may be as follows. The maximum supply flow rate is typically 0.1 lb/sec; the maximum control flow rate is typically 0.01 lb/sec; the maximum control pressure is typically 10,000 psi; the maximum supply pressure is typically 10,000 psi; the response time (from chamber fill time) is typically less than 0.5 milliseconds; the discharge coefficient without a vortex is typically 0.9; the discharge coefficient with a vortex is typically in the range of 0.08 to 0.2; and the minimum Reynolds number is greater than 3,000. The outlet diameter for the valve is typically in the range of 1.0 to 3.0 millimeters; the ratio of the outlet diameter to the chamber diameter is typically in the range of 0.1 to 0.25 millimeters; and the ratio of the vortex chamber height to the vortex chamber diameter is typically in the range of 0.725 to 0.325.

The amount of control fluid flow rate, by weight, required to shut down the slurry, is usually equal to about ten percent of the instantaneous slurry flow rate. The control pressure required to produce shut down is on the order of 1.5 to 2.0 times the slurry pressure at the supply inlet to the valve. The ratio between the instantaneous supply flow rate to the control flow rate is defined as the flow turn-down ratio at a constant value of supply pressure. The ratio between the control pressure and the supply pressure required to produce complete shut down of the supply is called the flow cut-off pressure ratio. The time required to produce (and to dissipate) the vortex governs the response time. Turn down ratio, cut-off pressure ratio and response time are all both geometry-dependent and functions of the properties of the fluids employed in the system. By using a Newtonian fluid, such as Water, diesel oil or compressed air, to produce vortex throttling, performance of a vortex valve is unaffected by the non-Newtonian properties of the slurry fuel.

Referring again to FIG. 14, in this circuit the slurry constitutes the supply flow delivered under pressure to the vortex valve 102. The clean supply fluid is supplied via the actuator valve 104 to the control port of valve 102. Each time the timing cam 106 closes actuator valve 104, the control flow is shut off and fuel is injected into the engine cylinder 10 via vortex nozzle 107. When the actuator 104 is opened, slurry flow is shut off. In this circuit, compressed air is utilized as the control fluid and a coal-water mixture is utilized as the fuel. Because the control air must pass through the vortex valve during most of the operating cycle, that air may also be utilized to help scavenge the cylinder, as well as the vortex nozzle, to precharge the engine, or to warm up the incoming atmospheric air charge. However, if liquid fuels are employed instead of air, a check valve and bleed would be needed to prevent control flow from entering the cylinder during the intake and exhaust portions of the cycle.

Figure 15:
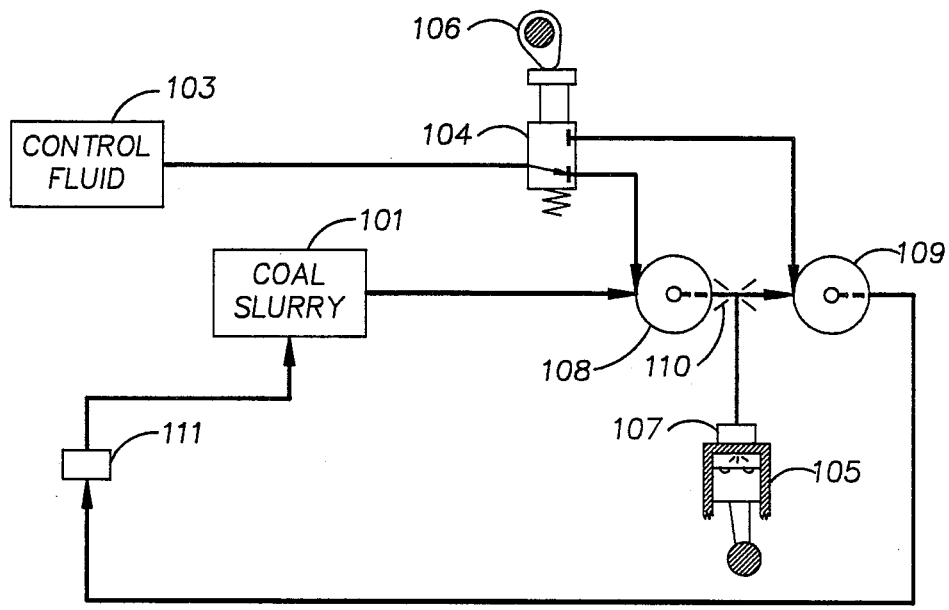
FIG. 15 is a schematic illustration of another fluidic coal slurry fuel injection circuit constructed in accordance with the present invention.

An alternative fluidic coal slurry fuel injection circuit is illustrated in FIG. 15 to which specific reference is now made. In this embodiment two vortex valves 108 and 109 are utilized in connection with a venturi nozzle disposed therebetween. Specifically, the venturi nozzle 110 is disposed between the outlet port of vortex valve 108 and the radial inlet port of vortex valve 109. In this circuit the actuator valve 104 diverts the clean fluid to the tangential control ports of the vortex valves 108 and 109 in an alternative manner. When a vortex is produced by the control fluid in vortex valve 108, a small amount of clean fuel exits from the vortex valve at a relatively low pressure, passes through the venturi 110, and is recirculated through the system via filter 111 to the pump in the fuel supply 101. A connection between the throat in venturi nozzle 110 and the fuel inlet port of vortex nozzle 107 experiences a low pressure that is lower than the pressure in the engine cylinder during the intake portion of the nozzle. When the clean fluid is diverted by the actuator to the control port of valve 109, that valve closes and valve 108 opens to force a fuel charge into the engine cylinder. Normally the actuator shuts off the coal slurry in vortex valve 108. However, a small amount of clean fluid is permitted to pass through valve 108. When this clean fluid passes through the venturi nozzle 110, a low pressure in that nozzle produces a suction on the line to the vortex valve 107 so that no fluid can enter the engine cylinder.

Figure 16:
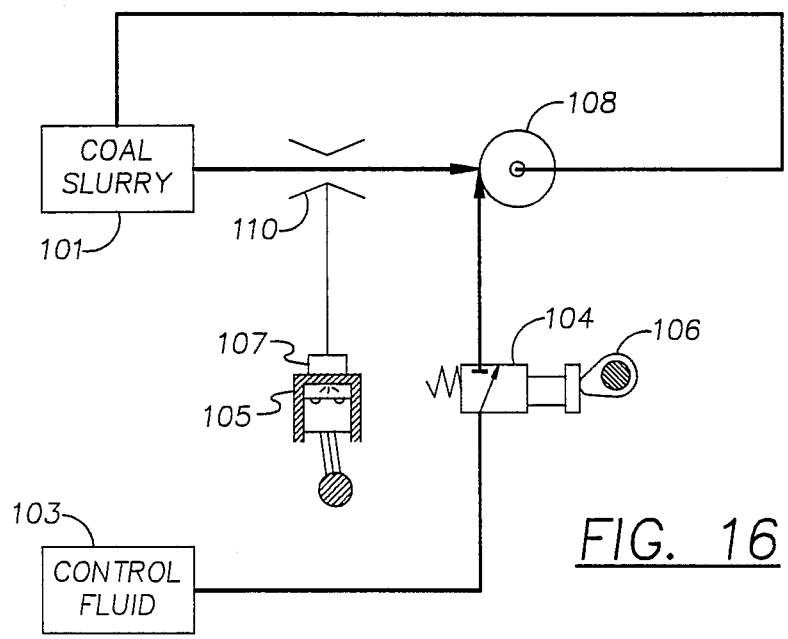
FIG. 16 is a schematic illustration of a fluidic constant flow slurry injection circuit constructed in accordance with the principles of the present invention.

In the circuit of FIG. 16 the slurry is supplied at a constant flow rate to vortex valve 108 through venturi 110. When the vortex valve is open, pressure in the throat of venturi 110 is lower than the cylinder pressure. The pressure recovered downstream of venturi 110 is utilized to circulate the slurry through vortex valve 108 and a return line leading back to the coal slurry supply pump in the supply 101. When the actuator valve 104 opens, clean control fluid (diesel fuel or water) is delivered to the control port of valve 108 and the vortex valve is shut down. If the pressure at the inlet port of the vortex valve is, for example, 50 psi when the vortex valve is open, and the turn down ratio is 10:1, then the change in pressure that occurs when the vortex vale cuts off is on the order of 4,000 to 5,000 psi, depending upon the size of the vortex injector spray nozzle. Thus, since constant flow is maintained, pressure increases for fuel to be injected into the cylinder.

Figure 17:
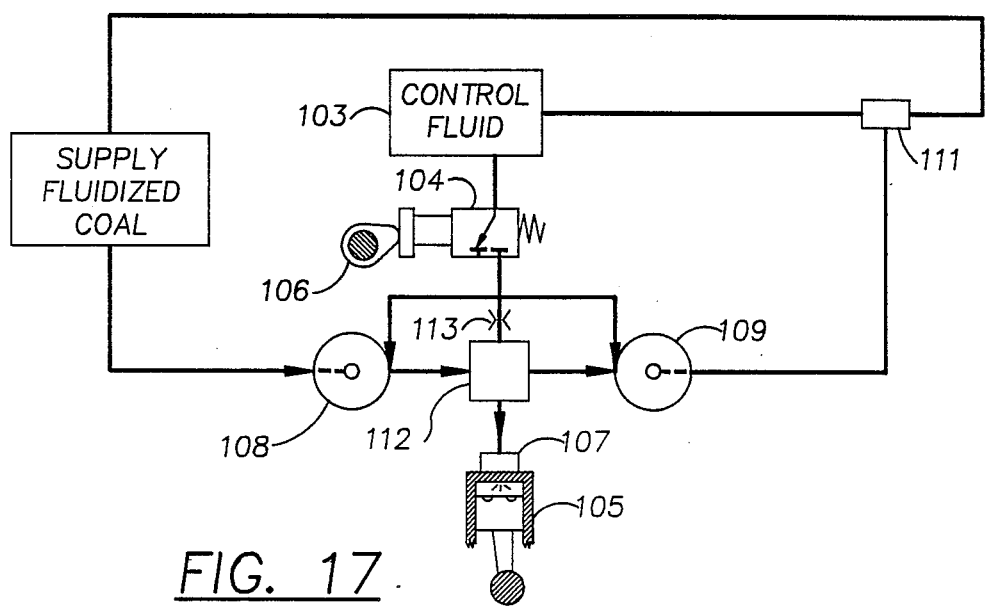
FIG. 17 is a schematic illustration of a fluidized coal fluidic fluid injection circuit constructed in accordance with the principles of the present invention.

Referring to the circuit illustrated in FIG. 17, vortex valves 108 and 109 are employed in conjunction with an ejector pump 111 to control dry, powdered coal employed as the fuel. In this case, instead of water, the fluidized coal fuel comprises air as the carrier fluid. A compressor provides high pressure air as the control fluid from source 103 and a regulated pressure to the actuator valve 104 and to the ejector pump 111. The ejector pump aspirates fluidized coal through the exhaust port of vortex valve 108 into a metering chamber 112 and then through the supply port of vortex valve 109. When the timing cam 106 causes the actuator valve to open, clean air shuts off the two vortex valves 108 and 109. When both of these valves are closed, a fixed amount of fluidized coal is trapped in the metering chamber 112. The coal is swept out of the metering chamber and into the engine cylinder by the high pressure air flow delivered by the actuator valve 104 and resistor 113. The amount of fluidized coal injected into the engine is determined by the volume of metering chamber 112. When the vortex valves are reopened, fluidized coal is recirculated through the system back to the coal intake device.

FIG. 18 is a diagrammatic illustration of the flow-controlling portions of the circuit of FIG. 16 and contains reference numerals that are identical to those employed in that circuit. The slurry fuel passing through vortex nozzle 110 is directed to the periphery of vortex valve 108 to permit entry of the fluid into the valve via radially-directed supply ports. The control fluid, under the control of actuator 104, enters the vortex valve 108 tangentially. Closure of valve 108 by the control fluid causes the slurry to be pressurized in venturi nozzle 110 from which it is: delivered to the vortex nozzle 107 in the manner described above.

From the foregoing description it will be appreciated that the invention makes available a novel fuel injection system capable of utilizing coal slurry-type fuels wherein the fuel can be atomized and controlled at significantly lower pressures than have been heretofore possible in the prior art.

Having described preferred embodiments of a new and improved fuel injection system in accordance with the present invention, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What I claim is:

1. Apparatus for injecting atomized coal slurry fuel into an engine combustion chamber comprising:
   vortex nozzle means, having an annular chamber with a substantially central outlet port and a peripheral fuel inlet port, for providing output flow from said outlet port, of fluid supplied to said fuel inlet port, in a conical sheet pattern that breaks up into atomized spray;
   metering means for delivering pressurized metered charges of said coal slurry fuel to said fuel inlet port at a pressure that is on the order of approximately five thousand psi or less and is sufficient to produce said conical sheet pattern output flow from said outlet port;
   vortex-inducing means for imparting a tangential flow component to the coal slurry fuel entering said annular chamber via said fuel inlet port; and
   mounting means for positioning said vortex nozzle means to issue said conical sheet pattern of coal slurry fuel from said outlet port into said engine combustion chamber.

2. The apparatus according to claim 1 wherein said vortex-inducing means comprises a tangential orientation of said peripheral fuel inlet port relative to the periphery of said annular chamber.

3. The apparatus according to claim 1 wherein said fuel inlet port is directed generally radially into said annular chamber and wherein said vortex-inducing means comprises control means for issuing a control fluid into said annular chamber with a tangential flow component and at a pressure sufficient to impart a tangential flow component to coal slurry fuel entering said annular chamber via said fuel inlet port.

4. The apparatus according to claim 3 further comprising self-cleaning means for purging said annular chamber of coal slurry particles at times between entry of said metered coal slurry charges, and preventing char particles from said combustion chamber from entering said annular chamber via said outlet port.

5. The apparatus according to claim 4 wherein said self-cleaning means comprises means for issuing said control fluid tangentially into said annular chamber at times between said metered coal slurry fuel charges and at a pressure sufficient to carry coal slurry residue out of said annular chamber via said outlet port.

6. The apparatus according to claim 5 wherein said control means includes means for issuing pressurized air tangentially into said annular chamber.

7. The apparatus according to claim wherein said control means includes means for issuing pressurized liquid diesel fuel tangentially into said annular chamber.

8. The apparatus according to claim 5 further comprising periodically actuable valve means for alternatively increasing and decreasing the pressure of said control fluid in said chamber in synchronization with the delivery of said metered charges of coal slurry fuel to said vortex nozzle means, such that when the pressure of said control fluid in said annular chamber is relatively high it blocks entry of fluid into the annular chamber via said fuel inlet port, and when the pressure of the control fluid in said annular chamber is relatively low it imparts a tangential flow component to fluid entering the annular chamber via the fluid inlet port.

9. The apparatus according to claim 1 further comprising self-cleaning means for urging said annular chamber of coal slurry particles at times between entry of said metered coal slurry charges, and preventing particles from said combustion chamber from entering said annular chamber via said outlet port.

10. The apparatus according to claim 9 wherein said self-cleaning means comprises means for issuing a control fluid tangentially into said annular chamber at times between said metered coal slurry fuel charges entering said chamber and at a pressure sufficient to carry coal slurry residue out of said annular chamber via said outlet port.

11. The apparatus according to claim 10 further comprising periodically actuable valve means for alternatively increasing and decreasing the pressure of said control fluid in said chamber in synchronization with the delivery of said metered charges of coal slurry fuel to said vortex nozzle means, such that when the pressure of said control fluid in said annular chamber is relatively high it blocks entry of fluid into the annular chamber via said fuel inlet port, and when the pressure of the control fluid in said annular chamber is relatively low it imparts a tangential flow component to fluid entering the annular chamber via the fluid inlet port.

12. The apparatus according to claim 1 wherein said metering means comprises:
   a diaphragm pump having fluid-isolated input and output chambers separated by a diaphragm, said output chamber having inflow and outflow ports;
   means for delivering said coal slurry fuel to said output chamber via said inflow port at relatively low pressure;
   check valve means for preventing outflow from, but permitting inflow into, said output chamber via said inflow port;
   pulsing means for selectively pressurizing said input chamber at sufficiently high pressure to deflect said diaphragm into said output chamber and force said metered charges of coal slurry fuel out through said outflow port; and
   means for conducting fluid from said outflow port to said fuel inlet port of said vortex nozzle means;
   wherein said sufficiently high pressure is the same for each selective pressurization of said input chamber to thereby provide all of said metered charges of coal slurry fuel at equal pressure.

13. The apparatus according to claim 12 wherein said pulsing means comprises means for delivering a series of pulses of hydraulic fluid to said input chamber at a repetition rate determined by fuel demand in said engine combustion chamber.

14. The apparatus according to claim 1 wherein said metering means comprises:
- a flow passage for conducting said coal slurry fuel under pressure and having a venturi section with an upstream end, a downstream end and a restricted throat portion located intermediate said upstream and downstream ends;
- a first vortex valve having a main fluid inlet port connected to the downstream end of said venturi section, said vortex valve further including a main fluid outlet port and first valve control means for selectively pressurizing said first vortex valve to thereby restrict outflow through said main fluid outlet port and develop a back pressure in the coal slurry fuel at said main fluid inlet port and in said venturi section; and
- conduit means for conducting said coal slurry fuel from said throat portion of said venturi section to said fuel inlet port of said vortex nozzle means in response to said back pressure in the coal slurry fuel at said venturi section.

15. The apparatus according to claim 14 wherein said main inlet port is oriented to issue said coal slurry fuel radially into said vortex valve, and wherein said first valve control means comprises actuable means for selectively issuing a control fluid under pressure into said vortex valve with a tangential flow component and at a pressure that is sufficiently high to cut off flow of said coal slurry fuel between said main fluid inlet and main fluid outlet ports.

16. The apparatus according to claim 15 wherein said actuable means comprises a cam-operated valve operable in synchronization with fuel demand in said engine combustion chamber.

17. The apparatus according to claim 14 wherein said metering means further comprises:
- a second vortex valve having a main fluid inlet port, a main fluid outlet port connected to the upstream end of said venturi section, and second valve control means for selectively pressurizing said second vortex valve to restrict outflow through its main fluid outlet port;
- means for delivering said coal slurry fuel under pressure to the main fluid inlet port of said second vortex valve; and
- timing means for synchronizing said first valve control means and said second valve control means in alternation such that said first vortex valve is pressurized when the second vortex valve is not, and vice-versa.

18. The apparatus according to claim 17 wherein the main fluid inlet port in each of said first and second vortex valves is oriented to issue the coal slurry fuel radially into said first and second vortex valves, respectively; and wherein said first and second valve control means include means for selectively issuing said control fluid under pressure into said first and second vortex valves, respectively, with a tangential flow component and at a pressure that is sufficiently high to cut off flow of said coal slurry fuel through said first and second vortex valves, respectively.

19. The apparatus according to claim 18 wherein said actuable means comprises further valve means operable in synchronization with fuel demand in said engine combustion chamber.

20. The apparatus according to claim 1 wherein said metering means comprises:
- a vortex valve having a main fluid inlet port for receiving said coal slurry fuel under pressure and for issuing the coal slurry fuel radially into the valve, a main fluid outlet port, and valve control means for selectively issuing a control fluid under pressure into said vortex valve with a tangential flow component and at a pressure that is sufficiently high to cut off flow of said coal slurry fuel between said main inlet port and said main outlet port; and
- conduit means connecting said main fluid outlet port of said vortex valve to the fuel inlet port of said vortex nozzle;
- wherein said valve control means includes actuable valve means, responsive to the fuel demand in said engine combustion chamber, for pulsedly delivering said control fluid to said vortex valve.

21. Apparatus for injecting fluidized coal fuel into an engine combustion chamber comprising:
- nozzle means responsive to application of said fluidized coal fuel thereto, under pressure, for issuing the fuel into said engine combustion chamber; and
- vortex valve means for selectively controlling flow of said fluidized coal fuel therethrough to apply measured charges of said fluidized coal fuel under pressure to said nozzle means, said vortex valve means including valve control means for selectively issuing a control fluid i!:to said vortex valve means with a tangential flow component and at a pressure sufficiently high to cut off flow of said fluidized coal fuel through said vortex valve means.

22. The apparatus according to claim 21 wherein said vortex valve means includes: a first vortex chamber, a first outlet port, a first inlet port for receiving said fluidized coal fuel under pressure and issuing the fuel radially into said first vortex chamber, and a first control port for selectively issuing a control fluid into said first vortex chamber with a tangential flow component and at a sufficiently high pressure to cut off the flow of said fluidized coal fuel between said first inlet port and said first outlet port.

23. The apparatus according to claim 22 wherein said first inlet port is connected to a source of said fluidized coal fuel, wherein said first outlet port is connected to said nozzle means, and further comprising actuable means responsive to fuel demand at said combustion chamber for alternatively delivering and inhibiting flow of said control fluid under pressure to said first control port.

24. The apparatus according to claim 22 wherein said vortex valve means further comprises a second vortex chamber, a second outlet port, a second inlet port for receiving said fluidized coal fuel under pressure and issuing the fuel radially into said second vortex chamber, and a second control port for selectively issuing said control fluid into said second vortex chamber with a tangential flow component and at a sufficiently high pressure to cut off flow of said fluidized coal fuel between said second inlet port and said second outlet port;
said apparatus further comprising:
- a flow passage for conducting said coal slurry fuel under pressure and having a venturi section with an upstream end, a downstream end and a restricted throat portion located intermediate said upstream and downstream ends;

conduit means for conducting said coal slurry fuel from said throat portion of said venturi section to said nozzle means; and timing means for delivering said control fluid under pressure alternatively to said first and second control ports at a repetition rate determined by the demand for fuel at said engine combustion chamber;

wherein said first inlet port is connected to a source of said fluidized coal fuel under pressure, said first outlet port is connected to the upstream end of said venturi section, said second inlet port is connected to the downstream end of said venturi section, and said second outlet port is connected by return line to said source of fluidized coal fuel;

whereby pressurization of said second vortex valve by said control fluid develops a back pressure in the fluidized coal fuel in said venturi section and directs the fluidized control fuel to said nozzle means via said conduit means.

25. The apparatus according to claim 22 further comprising:

a flow passage for conducting said fluidized coal fuel under pressure and having a venturi section with an upstream end, a downstream end and a restricted throat portion located intermediate said upstream and downstream ends, said upstream end being connected to a supply of said fluidized coal fuel under pressure;

conduit means for conducting said coal slurry fuel from said throat portion of said venturi section to said nozzle means in response to back pressure of the fluidized coal fuel in said venturi section;

timing means for pulsedly delivering said control fluid under pressure to said control port at a repetition rate determined by the demand for fuel at said engine combustion chamber;

wherein said inlet port is connected to the downstream end of said venturi section, and wherein said outlet port is returned to said supply of said fluidized coal fuel.

26. The apparatus according to claim 21 wherein said vortex valve means comprises:

a first vortex chamber, a first outlet port from said vortex chamber, an inlet port for receiving said fluidized coal fuel and issuing the fuel radially into said first vortex chamber, and a control port for selectively issuing a control fluid into said first vortex chamber with a tangential flow component and at a sufficiently high pressure to cut off flow of said fluidized coal fuel between said first inlet port and said first outlet port;

a second vortex valve having a second vortex chamber, a second outlet port, a second inlet port for receiving said fluidized coal fuel and issuing the fuel radially into said second vortex chamber, and a second control port for selectively issuing said control fluid into said second vortex chamber with a tangential flow component and at a sufficiently high pressure to cut off flow of said fluidized coal fuel between said second inlet port and said second outlet port;

said apparatus further comprising:

a metering chamber having first and second inlets and first and second outlets, said second outlet being connected to said nozzle means;

an ejector pump having an input port connected to receive said control fluid, an output port connected to a return line for a source of said fluidized coal fuel, and an aspiration port for aspirating fluid into the control fluid flow between the injector pump input and output ports;

wherein at said first vortex valve said first inlet port is connected to said source of said fluidized coal fuel, and said first outlet port is connected to said first inlet of said metering chamber;

wherein at said second vortex valve said second inlet port is connected to said first outlet of said metering chamber, and said second outlet port is connected to the aspiration port of said injector pump;

actuable means for providing a series of pulses of pressurized control fluid at a repetition rate that is a function of the demand for fuel in said engine combustion chamber; and means for delivering said pulses of pressurized control fluid simultaneously into the first control port of said first vortex valve, the second control port of the second vortex valve, and the second inlet of the metering chamber;

whereby, in the absence of said pulses of control fluid, there is a flow of said fluidized coal fuel from said source through said first vortex valve, said metering chamber via its first inlet and first outlet, the second vortex valve, and the injection pump via its aspiration and output ports; and whereby, in response to each pulse of said control fluid, both said first and second vortex valves are blocked to the flow of said fluidized coal fuel, and said metering chamber is pressurized to force said measured charge of fluidized coal fuel out through the metering chamber second outlet to said nozzle means.

27. The method of injecting coal slurry fuel into an engine combustion chamber comprising the steps of:

delivering measured charges of said coal slurry fuel to a vortex nozzle at a pressure of five thousand psi or less; and issuing each measured charge into said engine combustion chamber in a conical sheet flow pattern that breaks up into atomized particles of the coal slurry fuel in said combustion chamber.

28. The method according to claim 27 further comprising the step of:

periodically cleaning said vortex valve of contaminants from said coal slurry fuel by issuing a pressurized control fluid tangentially into said vortex nozzle to entrain said contaminants and issue them with the control fluid into said engine combustion chamber.

* * * * *